United States Patent
Hoffmann

(10) Patent No.: US 6,523,986 B1
(45) Date of Patent: Feb. 25, 2003

(54) LIGHT SIGNALING DEVICE FOR FLOORS

(76) Inventor: Friedeman Hoffmann, c/Alicante, 16 - Polg. Ind. Fonollar, 08830, Sant Boi de Llobregat, Barcelona (ES)

(*) Notice: Subject to any disclaimer, the term of this patent is extended or adjusted under 35 U.S.C. 154(b) by 0 days.

(21) Appl. No.: 09/914,910

(22) PCT Filed: Mar. 10, 2000

(86) PCT No.: PCT/ES00/00085
§ 371 (c)(1),
(2), (4) Date: Sep. 5, 2001

(87) PCT Pub. No.: WO00/55541
PCT Pub. Date: Sep. 21, 2000

(30) Foreign Application Priority Data

Mar. 16, 1999 (ES) .................................. 9900673 U

(51) Int. Cl.[7] .............................. F21S 8/00; F21V 8/00
(52) U.S. Cl. ...................... 362/576; 362/153; 362/224; 362/374
(58) Field of Search ................................. 362/145, 146, 362/153, 153.1, 217, 223, 224, 240, 244–246, 374, 375, 559, 576

(56) References Cited

U.S. PATENT DOCUMENTS

| | | | | | |
|---|---|---|---|---|---|
| 5,430,627 A | * | 7/1995 | Nagano | ....................... | 362/146 |
| 5,499,170 A | * | 3/1996 | Gagne | ......................... | 362/153 |
| 5,791,764 A | * | 8/1998 | Jaksich | ........................ | 362/223 |
| 6,152,573 A | * | 11/2000 | Mitchell | ...................... | 362/223 |

* cited by examiner

Primary Examiner—Alan Cariaso
(74) Attorney, Agent, or Firm—Notaro & Michalos P.C.

(57) ABSTRACT

A lit-up marking device for floors includes a section with a generally U-shaped layout defined by a flat base and by two end wings. Intermediate inlets for the pressure-fitting of a translucent protector are at the flat base. Lighting is positioned on a longitudinal support housed in the section and a translucent protector has a central portion and two side feet forming an arrow-head for fitting into the section. The wings of the section have, on their interior end, respective concavities which face concavities formed on the exterior in the initial zone of the side legs of the translucent protector. The cavities form one cavity with an opening for inserting optional elements for fixing the translucent protector onto the section.

11 Claims, 3 Drawing Sheets

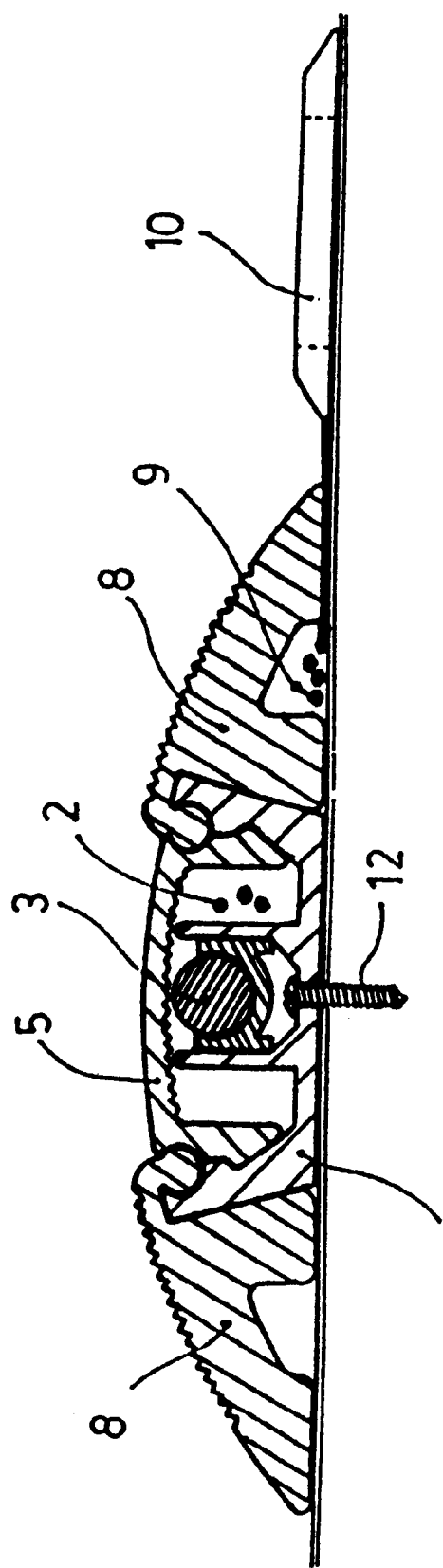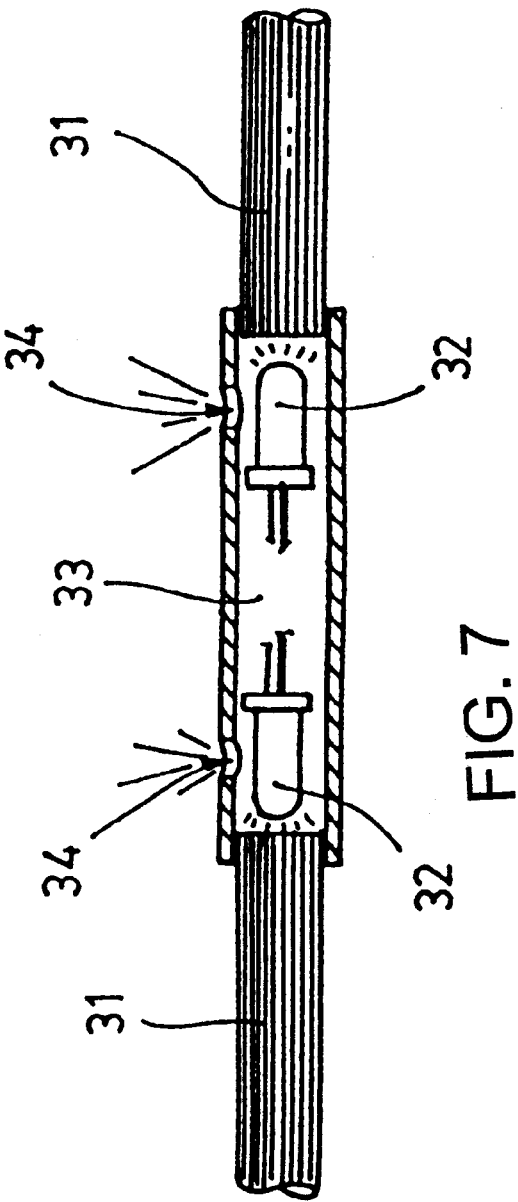

LIGHT SIGNALING DEVICE FOR FLOORS

PURPOSE OF THE INVENTION

As indicated by its title, this invention relates to a lighted floor signalling device of the type composed of a section intended to be mounted on the area of the floor to be signalled, lighting means mounted longitudinally inside the section and a translucid guard placed on top of the section which allows the light given off by the internal lighting means to shine through.

BACKGROUND TO THE INVENTION

As background to the invention, Utility Models 980269 and 9803048 both pertain to the applicant of this invention.

Utility Model 9802069, which refers to a lighted section, is composed of an L-shaped section intended to be positioned on the vertex of a step, stair or any other uneven surface. This section contains a longitudinal cavity for housing the lighting means used to emit the light needed to signal the uneven surface.

Utility Model 9803048 refers to certain improvements to the lighted floor signalling device for steps, stairs and the like which consists of an L-shaped section intended to be mounted on the inside edge of a step with an interior cavity for running wires.

In this case, as in the preceding case, on the outside of the section there is a longitudinal box which houses the lighting means, protected by a translucent cover.

The devices described in both models are intended to signal uneven surfaces such as steps, stairs, etc., but cannot be used as lighted signalling on flat floor surfaces due precisely to the L-shaped configuration of the sections making up the device.

DESCRIPTION OF THE INVENTION

The lighted floor signalling device to which this invention refers presents certain constructive particularities designed to permit the signalling of flat floor surfaces such as both sides of a passageway, and may be built into the floor, protruding therefrom and holding down the ends of floor coverings such as rugs, carpeting, etc. with side wedges.

In accordance with the invention, the lighted floor signalling device consists of a U-shaped section composed of a flat base which is supported by and fastened to the floor area to be signalled and two wings on either end equipped with means to fasten the translucid guard by pressure.

On the inside of the lighted floor signalling device there are two ribs which start from the base and form a prismatic cavity for positioning the lighting means and their supports inside.

Between the inside lips and the side wings, the section is equipped with longitudinal cavities for running electrical, sound, telephone or any other type of wiring.

Inside the wings, on either end, there are rabbets which are used for the pressurised attachment of the translucent guard and on either end two open concavities toward the central part of the section.

The translucent guard intended to be mounted on the section has a slightly convex central portion and two side legs in an arrowhead shape intended to be housed in the intermediate rabbets inside the wings of the section.

The inside surface of the central portion of the guard is serrated so as to diffuse the light given off by the lighting means housed inside the section.

The outside initial portion of the side legs of the guard is equipped with concavities which are positioned opposite the concavities located on the ends of the section wings to form open cavities on the upper part for the introduction of optional fastening means.

The fastening means of the guard and the section in the mounted position may be composed either of elastic joints analogous, in section to the previously mentioned cavity or of the end portions of side wedges.

Elastic joints are used when the device is built into the floor or when used to offset a slight unevenness such as the end of a floor covering like parquet which is considerably similar in height.

The wedges mentioned above are used when it is necessary to finish off the side of the device, forming ramps which extend from the top of the section to the floor or to the level of a floor covering which is lower in height.

The wedges are made of a non-metallic material, preferably of PVC or rubber, and are serrated on top to prevent slipping.

The wedges are triangular in shape with a lower rabbet for running optical fibre cable or other types of wiring.

According to the invention, the lighting devices housed inside the section may be composed of LEDS, small incandescent light bulbs, or optical monofibres or multifibres. If the lighting means are made of optical fibre, they will be composed of sections the ends of which are placed opposite the LEDS or small light bulbs housed intermediate splicing tubes.

The splicing tubes are composed of an opaque material and equipped with holes facing the LEDS or small light bulbs to obtain visible lighted points on the splicing areas.

DESCRIPTION OF THE DRAWINGS

To complement this description, and in order that the features of the invention may be better understood, this specification is accompanied by a set of drawings. Their purpose is illustrative and not restrictive, and they show the following:

FIG. 6 is a cross-section of the lighted floor signalling device in which the end portions of two equal wedges which offset the unevenness of the floor are used as fastening devices. This figure shows optical fibre cable running through the rabbet of one of the wedges, one of them being connected to a row-numbering device.

FIG. 7 illustrates the lighting device composed of sections of optical fibre cable, the ends of which are facing LEDS housed inside the splicing tubes.

PREFERRED EMBODIMENT OF THE INVENTION

Figure 1:
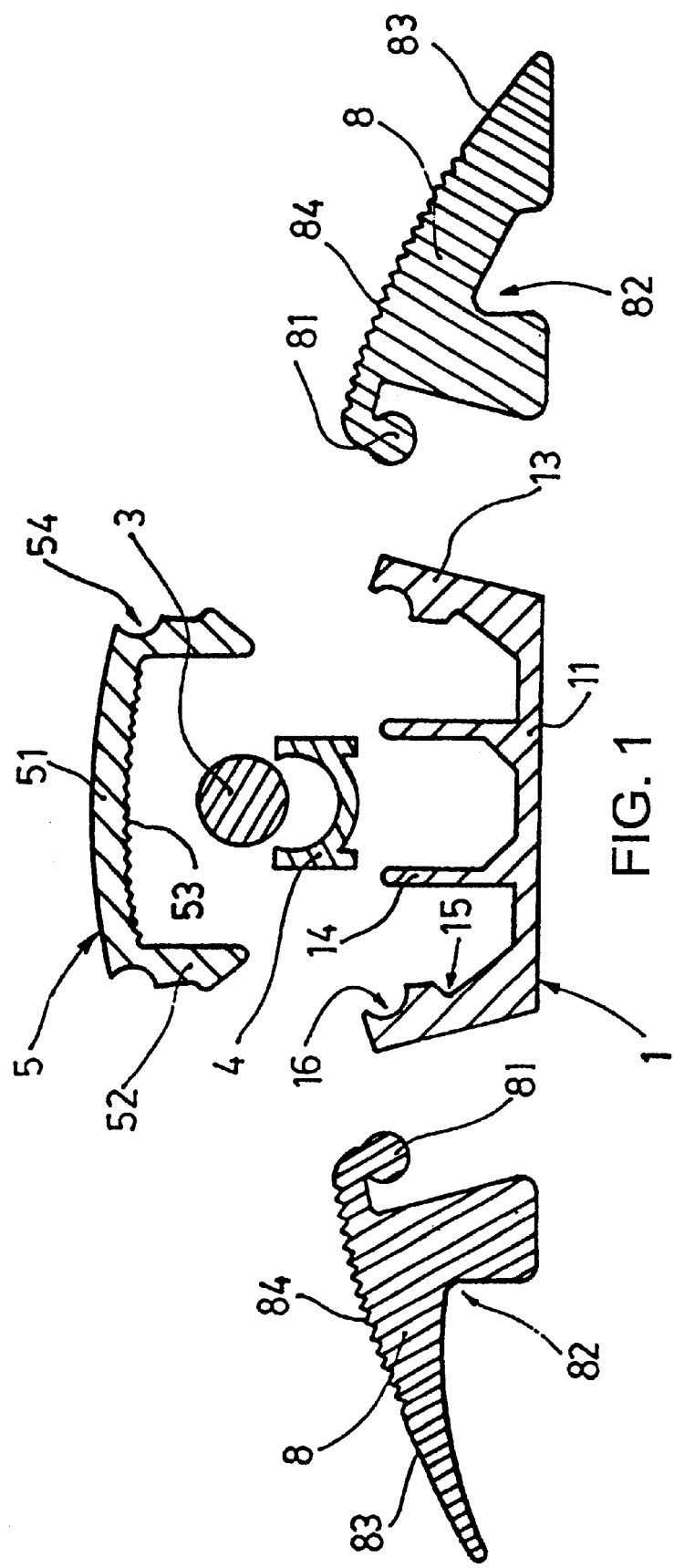
FIG. 1 is an illustration of the section showing its different components, with the exception of the elastic joints which can be used to fasten the translucent guard to the section.
Figure 2:
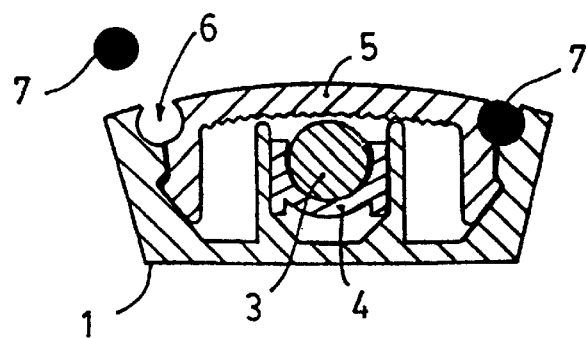
FIG. 2 is a cross-section of the mounted device, using the elastic joints as fastening devices to connect the translucent guard to the section.
Figure 3:
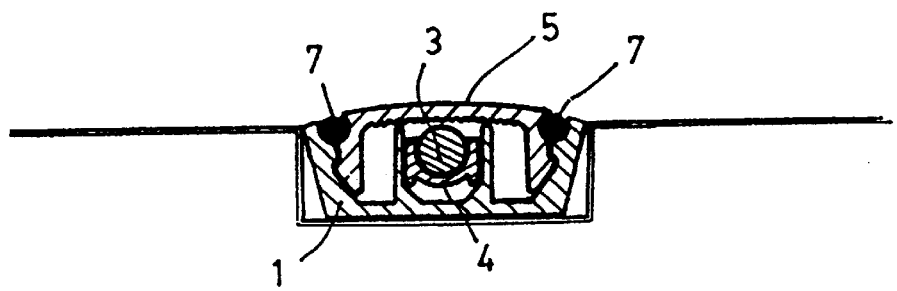
FIG. 3 is a cross-section of the same device as shown in the preceding figure, built into the floor.
Figure 4:
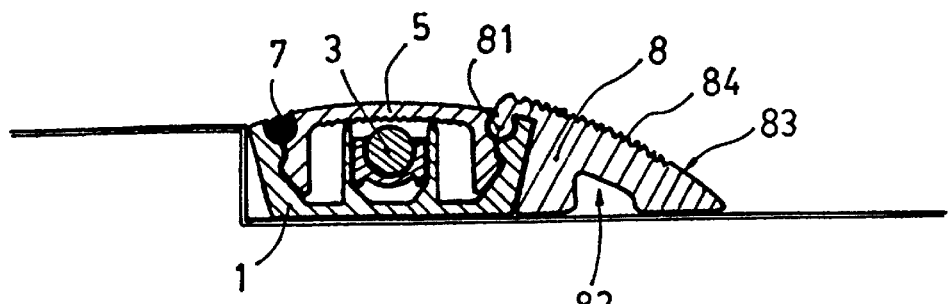
FIG. 4 shows the mounted device using an elastic joint and the end portion of one of the wedges as fastening devices. In this figure, the signalling device is used to offset an uneven surface.

As may be observed in the figures referred to, the lighted floor signalling device is composed of a section (1) with a flat base (11) intended to be supported by and fastened to the floor using screws 12), two end wings (13) and some internal ribs (14).

The wings of the section are equipped on the inside with rabbets intermediate (15) and concavities on the ends (16).

In between the internal ribs (14) and the wings (13) of the section there are longitudinal cavities for running cables (2).

The invention includes lighting devices (3) which are positioned between the ribs (14) and supported on a longitudinal support (4). The lighting devices may be LEDS, small incandescent light bulbs or successive sections (31) of optical monofibres or multifibres. In this case, the ends of the optical fibre sections (31) will face the LEDS or light bulbs (32) placed inside a splicing tube (33) as shown in detail in FIG. 7.

The tube (33) has holes (34) arranged radially facing the LEDS or light bulbs (32) to create visible points of light on the splicing area.

The section (1) is closed on top using a translucent guard (5) composed of a central convex portion (51) and two side legs (52) in an arrowhead shape which retain the guard in the fastened position when facing the rabbets (15) of the wings of the section.

The inside of the central portion (51) of the guard is serrated (53) to enable it to diff-use the light.

The legs (52) of the guard are equipped with concavities (54) positioned in an outward manner and intended to face the concavities (16) of the section (1) thereby forming cavities (6) which are open on the top for the placement of optional fastening devices.

The optional fastening devices may be elastic joints (7) or the end portions (81) of the wedges (8).

The elastic joints (7) are mounted on the cavities (6) when the side of the device is to be affixed to a slight unevenness in the floor or when being built in or affixed to the end of a rigid floor covering such as parquet.

Figure 5:
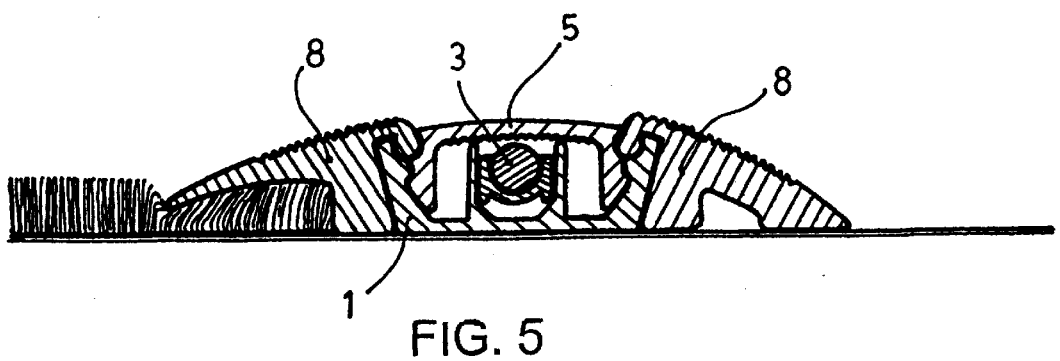
FIG. 5 is a section analogous to the preceding ones in which the end portions of a wedge which forms a ramp to the floor and of another wedge which offsets the unevenness to the carpeting type floor covering are used as fastening devices to fasten the guard to the section.

The end portions (81) of the.wedges are used as fastening devices when it is necessary to offset the unevenness between the upper end of the device itself and the floor or between said upper end and a floor covering which is lower than the device such as carpeting, as illustrated in FIG. 5.

The wedges (8) are made of a non-metallic material, preferably PVC or rubber and are triangular in shape with a lower rabbet (82) designed to conceal the passage of any type of wiring or optical fibre cables (9) particularly when an element (10) which must be illuminated or powered electrically is positioned near the device in question, as in the case of the row-numbering device illustrated in FIG. 6.

The upper sides (83) of the wedges are composed of inclined serrated surfaces (84) to prevent slipping.

As seen in FIG. 5, the free ends of the wedges (8) may be finished off at the same height as the lower end to make contact with the floor or higher up when used to hold the carpeting in place.

It is not considered necessary to extend this description any further in order for an expert on the subject to understand the scope of the invention and the advantages derived therefrom.

The terms in which this specification has been written should always be understood in the widest sense and in no way restrictive.

The materials, shapes, sizes and arrangement of the components are subject to change, provided that such changes do not alter the essential features of the invention as claimed below.

What is claimed is:

1. A lit-up marking device for floors, comprising:

a section (1) with a generally U-shaped layout, defined by a flat base (11) and by two end wings (13) which include on its interior sides some intermediate inlets (15) for the pressure-fitting of a translucent protector (5), lighting means (3) to be positioned on a longitudinal support (4) housed in the section (1) and a translucent protector (5) that has a central portion (51) and two side feet (52), each of the side feet forming an arrow-head, for fitting into the section (1); wherein the wings (13) of the section (1) have on the interior side end respective concavities (16) which are positioned facing some concavities (54) formed to the exterior in an initial zone of the side feet (52) of the translucent protector, with each set of opposed concavities (54 and 16) forming one cavity (6) for inserting optional fastening devices for fixing the translucent protector (5) onto the section (1).

2. A device according to claim 1, wherein an inside surface of the central portion (51) of the translucent protector (5) comprises a serrated (53) light diffuser.

3. A device according to claim 1, wherein the optional fastening devices for fixing the translucent protector (5) to the section (1) comprise elastic joints (7).

4. A device according to claim 1, wherein the optional fastening devices for fastening the translucent protector (5) to the section (1) are end portions (81) of wedges (8).

5. A device according to claim 4, wherein the wedges (8) are made of a non-metallic material.

6. A device according to claim 4, wherein the wedges (8) are made of one of PVC and rubber.

7. A device according to claim 4, wherein the wedges (8) are triangular in shape with upper sides (83) and equipped with a lower rabbet (82) for running wires or optical fiber cables (9).

8. A device according to claim 7, wherein the upper sides (83) of the wedges (8) are equipped with respective inclined surfaces to offset unevenness between the top of the section (1) and the floor or between the top of the section (1) and a floor covering.

9. A device according to claim 7, wherein the upper sides (83) of the wedges (8) are serrated (84) to prevent slipping.

10. A device according to claim 1, wherein the lighting means (3) may be composed of groups (31) of optical monofibers of multifibers, the ends of which are facing LEDS or light bulbs (32) housed in splicing tubes (33).

11. A device according to claim 10, wherein the splicing tubes (33) are composed of an opaque material and equipped with holes (34) facing the LEDS or small light bulbs (32) to create visible points of light.

* * * * *